United States Patent
Donate et al.

(10) Patent No.: US 11,976,211 B2
(45) Date of Patent: May 7, 2024

(54) WATER-BASED POLYURETHANE DISPERSIONS AND THEIR PREPARATION

(71) Applicant: Dow Global Technologies LLC, Midland, MI (US)

(72) Inventors: Felipe A. Donate, Midland, MI (US); Rebecca J. Wachowicz, Bay City, MI (US); Ellen D. Hock, Midland, MI (US); Jason L. Trumble, Bay City, MI (US); David S. Laitar, Midland, MI (US); Keosha L. Cade, Saginaw, MI (US)

(73) Assignee: Dow Global Technologies LLC, Midland, MI (US)

(*) Notice: Subject to any disclaimer, the term of this patent is extended or adjusted under 35 U.S.C. 154(b) by 318 days.

(21) Appl. No.: 17/290,995

(22) PCT Filed: Nov. 19, 2019

(86) PCT No.: PCT/US2019/062147
§ 371 (c)(1),
(2) Date: May 3, 2021

(87) PCT Pub. No.: WO2020/117465
PCT Pub. Date: Jun. 11, 2020

(65) Prior Publication Data
US 2022/0033676 A1 Feb. 3, 2022

Related U.S. Application Data

(60) Provisional application No. 62/776,047, filed on Dec. 6, 2018.

(51) Int. Cl.
*C09D 175/08* (2006.01)
*C08G 18/08* (2006.01)
*C08G 18/12* (2006.01)
*C08G 18/24* (2006.01)
*C08G 18/34* (2006.01)
*C08G 18/48* (2006.01)
*C08G 18/65* (2006.01)
*C08G 18/75* (2006.01)

(52) U.S. Cl.
CPC ....... *C09D 175/08* (2013.01); *C08G 18/0852* (2013.01); *C08G 18/12* (2013.01); *C08G 18/246* (2013.01); *C08G 18/348* (2013.01); *C08G 18/4825* (2013.01); *C08G 18/6541* (2013.01); *C08G 18/758* (2013.01)

(58) Field of Classification Search
CPC .. C09D 175/08; C08G 18/0852; C08G 18/12; C08G 18/246; C08G 18/348; C08G 18/4825; C08G 18/6541; C08G 18/758
See application file for complete search history.

(56) References Cited

U.S. PATENT DOCUMENTS

| | | | |
|---|---|---|---|
| 3,607,800 A | 9/1971 | Sekmakas | |
| 4,202,808 A * | 5/1980 | Fan | C09D 131/04 524/517 |
| 4,268,426 A * | 5/1981 | Williams | C08G 18/3221 528/80 |
| 4,269,426 A | 5/1981 | Bhushan | |
| 4,666,502 A | 5/1987 | Seckinger et al. | |
| 5,342,865 A | 8/1994 | Zwinselman et al. | |
| 5,576,188 A | 11/1996 | Schlaeppi et al. | |
| 6,121,336 A | 9/2000 | Okoroafor et al. | |
| 6,232,505 B1 | 5/2001 | Law | |
| 6,368,669 B1 | 4/2002 | Hughes et al. | |
| 6,376,718 B1 * | 4/2002 | Balan | C07C 45/002 568/405 |
| 8,927,646 B2 | 1/2015 | Erdem et al. | |
| 2013/0317167 A1 | 11/2013 | Morikami et al. | |
| 2020/0115487 A1 | 4/2020 | Ji et al. | |

FOREIGN PATENT DOCUMENTS

| | | |
|---|---|---|
| CN | 104212397 A | 12/2014 |
| CN | 105821165 A | 8/2016 |
| EP | 0018665 A2 | 11/1980 |
| EP | 0567248 A1 | 10/1993 |
| GB | 974818 A | 11/1964 |
| JP | H0948940 A | 2/1997 |
| JP | 2005194375 | 7/2005 |
| JP | 2018002835 A | 1/2018 |
| WO | 9217546 A1 | 10/1992 |

OTHER PUBLICATIONS

Gertzmann, R., & MaterialScience, B. (2012). Waterborne Polyurethane Coatings for Wood Floors—The Next Generation.
C. J. Hauthaway and Sons Corp. of Lynn, MA "Polyurethane Dispersions", https://hauthaway.com/formulating-guidelines/.
PCT/US2019/062147, International Search Report and Written Opinion dated Feb. 10, 2020.
PCT/US2019/062147, International Preliminary Report on Patentability dated Jun. 8, 2021.
Office Action from corresponding Brazilian Application: BR112021010910-2 dated May 10, 2023.
Office Action from corresponding Chinese 201980080478.0 application dated Sep. 20, 2022.

* cited by examiner

*Primary Examiner* — Jane L Stanley
(74) *Attorney, Agent, or Firm* — Arthur R. Rogers

(57) ABSTRACT

A prepolymer comprising an acid group is made by a process comprising the step of contacting: (i) a di-isocyanate, (ii) a polyol containing an acid group, and (iii) a polyol without an acid group, the contacting conducted under reaction conditions and in a solvent consisting essentially of: (A) a first component consisting essentially of at least one glycol ether ketone, and (B) optionally, a second component consisting of at least one aprotic glycol ether. The prepolymer is useful in the preparation of water-based polyurethane dispersions.

10 Claims, 1 Drawing Sheet

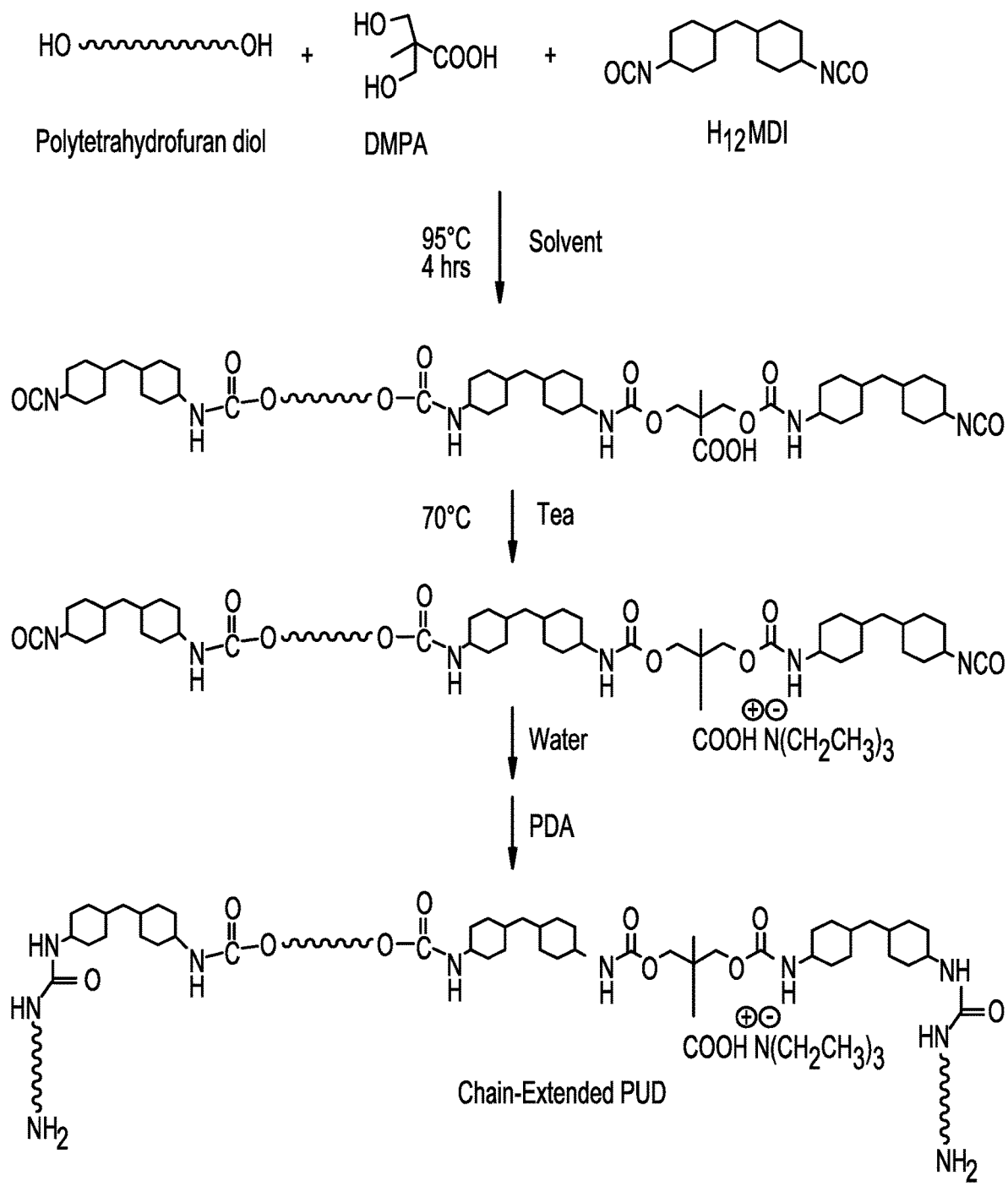

WATER-BASED POLYURETHANE DISPERSIONS AND THEIR PREPARATION

FIELD

Embodiments of the present invention relate to water-based polyurethane dispersions (PUD), processes for making prepolymers for PUDs, and processes for making PUDs.

BACKGROUND

Water-based polyurethane dispersions (PUDs) are versatile products often used in the formulation of various coatings and adhesives, either by themselves or in combination with other types of polymers. There are two different approaches in commercial production of polyurethane dispersions, the acetone process and the prepolymer process. As acetone is a flammable solvent, the prepolymer process is more widely used. The prepolymer process for PUD preparation is a two-step process. In step 1, a polyurethane/polyurea is synthesized in presence of an aprotic solvent which helps to solubilize reactants such as isocyanates, diols, and dimethylol propionic acid (DMPA), as well as to lower the viscosity of the reaction mixture. In step 2, this prepolymer is dispersed in water by the aid of surface active moieties. Quarternary ammonium salts incorporated into the polyurethane structure by neutralizing the DMPA with a tertiary amine provide sufficient ionic character to help disperse the polymer in the aqueous media. N-methyl-2-pyrrolidone (NMP) has been one of the most widely used aprotic solvents for PUD synthesis. NMP is a good solvent for the synthesis of the prepolymer, helps in the dispersion process, and ultimately acts as a coalescing aid when the PUD is applied as a film on a substrate. Additional information regarding PUD preparation with NMP can be found in "Polyurethane Dispersions", a web publication by C. J. Hauthaway and Sons Corp. of Lynn, MA, as well as elsewhere throughout the technical literature. Although NMP is an excellent solvent for PUD synthesis, it has recently been classified as a potential reprotoxic substance under the Registration, Evaluation, Authorization and Restriction of Chemical Substances (REACH), which drives the increasing safety and regulatory concerns of the European Union and influences regulations at global level. This has prompted an active search for suitable replacements.

Alkyl ketones such as acetone, methyl isobutyl ketone (MIBK), and methyl amyl ketone (MAK) can be used as solvents for the prepolymer synthesis. For example, "Waterborne Polyurethane Coatings for Wood Floors", a web publication from Gertzmann et al. of Bayer Materials Science, Pittsburgh, PA, describes the acetone process for PUD. However, due to their high volatility and poor performance as coalescing aids, the alkyl ketones are usually removed from the prepolymer before the dispersion step that yields the PUD. This makes it necessary to add a coalescing aid like dipropylene glycol mono n-butyl ether (e.g., DOWANOL™ DPnB) or other known coalescing aids used in the formulation of paints in order to obtain a suitable film from the PUD (see, e.g., Hauthaway publication). Although excellent coalescing aids, the mono-glycol ethers have a hydroxyl group and cannot be used in the prepolymer synthesis since they react with the isocyanate disrupting the formation of the prepolymer.

The ideal solvent in PUD synthesis should be compatible with water-based PUDs with good affinity for the polyol containing an acid group, e.g., DMPA.

SUMMARY

The present invention relates to processes for making a prepolymer comprising an acid group, processes for making water-based PUDs, blends that can be used as solvents in making PUDs, and to PUDs. The present invention utilizes glycol ether ketones as solvents for the preparation of PUDs. Such glycol ether ketones have been discovered to advantageously encompass desirable properties for the complete preparation of PUDs in that they are aprotic, are good solvents for the prepolymer synthesis, can be left in the prepolymer during the dispersion step without detriment to the final PUD stability or volatility concerns, and/or can act as coalescing aids for polyurethane films cast from the PUDs.

In some embodiments, the present invention relates to a process for making a prepolymer comprising an acid group that comprises the step of contacting
  (i) a di-isocyanate,
  (ii) a polyol containing an acid group, and
  (iii) a polyol without an acid group,
the contacting conducted under reaction conditions and in a solvent consisting essentially of:
  (A) a first component consisting of at least one glycol ether ketone, and
  (B) optionally, a second component consisting of at least one aprotic glycol ether.

In some embodiments, the present invention relates to a three-step process for making a water-based polyurethane dispersion (PUD) that comprises the steps of:
  (1) forming a prepolymer with acid group by contacting:
    (i) a di-isocyanate,
    (ii) a polyol containing an acid group, and
    (iii) a polyol without an acid group,
  the contacting conducted under reaction conditions and in a solvent consisting essentially of:
    (A) a first component consisting of at least one glycol ether ketone, and
    (B) optionally, a second component consisting of at least one aprotic glycol ether;
  (2) neutralizing the acid group of the prepolymer and any residual di-isocyanate with a base; and
  (3) dispersing the neutralized prepolymer in water and optionally extending the molecular weight with a chain extender.

In one embodiment the acid group of the polyol containing an acid group is a carboxyl group. In one embodiment the polyol containing an acid group is 2,2-dimethylolpropionic acid. In one embodiment the optional aprotic glycol ether is present. In one embodiment, the base is an amine In various embodiments of the processes of the present invention, the glycol ether ketone has the following structure:

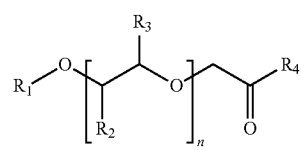

wherein $R_1$ is a linear or branched alkyl group having 1 to 8 carbon atoms, a benzyl group, or a phenyl group, wherein $R_2$ and $R_3$ can independently be hydrogen, $CH_3$, or $CH_2CH_3$, except that $R_2$ is hydrogen when $R_3$ is $CH_3$ or $CH_2CH_3$ and $R_3$ is hydrogen when $R_2$ is $CH_3$ or $CH_2CH_3$, wherein $R_4$ is CH$_3$ or CH$_2$CH$_3$, and wherein n is 0, 1, or 2. In some embodiments, the glycol ether ketone is 1-n-butoxy-2-propanone, 1-(2-methoxy-1-methylethoxy)-2-propanone, or 1-(2-n-propoxy-1-methylethoxy)-2-propanone.

In some embodiments, the present invention relates to a blend that can be used, for example, in the various processes disclosed herein, the blend comprising a glycol ether ketone and an aprotic glycol ether.

In some embodiments, the present invention relates to a polyurethane dispersion that comprises (i) a prepolymer comprising a neutralized acid group, (ii) a glycol ether ketone, and (iii) water. In some embodiments, the dispersion further comprises an aprotic glycol ether. In some embodiments, the neutralized acid group is an amine-neutralized carboxyl group.

These and other embodiments are discussed in more detail in the Detailed Description below.

BRIEF DESCRIPTION OF THE DRAWINGS

FIG. 1 illustrates a simple synthetic protocol for a water-based PUD. A PU polymer is made by reacting a di-isocyanate with a polyol containing an acid group and a polyol without an acid group. 2,2-Dimethylolpropionic acid (DMPA) is a polyol (specifically, a diol), and it is used to incorporate carboxylic acid functionality into the PU prepolymer. In the second step, the carboxylic acid functionality is neutralized with a tertiary amine, and in a third step, the neutralized PU polymer is dispersed in water and reacted with a diamine to extend the molecular weight and obtain the PUD. In step one, a polar solvent is used to dissolve DMPA during the prepolymer synthesis. In commercial practice, NMP is the most widely used solvent for this purpose. In this invention, the polar solvent is a system comprising a glycol ether ketone and, optionally, an aprotic glycol ether.

DETAILED DESCRIPTION

Definitions

For purposes of United States patent practice, the contents of any referenced patent, patent application or publication are incorporated by reference in their entirety (or its equivalent U.S. version is so incorporated by reference), especially with respect to the disclosure of definitions (to the extent not inconsistent with any definitions specifically provided in this disclosure) and general knowledge in the art.

Unless stated to the contrary, implicit from the context, or customary in the art, all parts and percents are based on weight and all test methods are current as of the filing date of this disclosure.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Prepolymer" and like terms mean a compound made from the reaction of a di-isocyanate and a polyol. Prepolymers are formed by combining an excess of diisocyanate with polyol. As shown in the illustration below, one of the isocyanate groups (NCO) of the di-isocyanate reacts with one of the hydroxy groups (OH) of the polyol; the other end of the polyol reacts with another di-isocyanate. The resulting prepolymer has an isocyanate group on both ends. The prepolymer is a di-isocyanate itself, and it reacts like a di-isocyanate but with several important differences. When compared with the original di-isocyanate, the prepolymer has a greater molecular weight, a higher viscosity, a lower isocyanate content by weight (% NCO), and a lower vapor pressure.

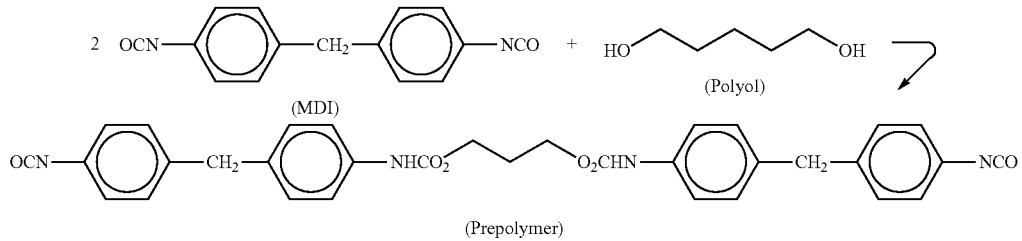

The prepolymer used in the practice of this invention includes one or more units derived from a polyol containing an acid group, e.g., DMPA, to introduce carboxylic acid functionality into the prepolymer.

"Acid group", "acid functionality" and like terms mean a substituent on a monomer, oligomer or polymer that donates protons, or hydrogen ions, in an aqueous solution.

"Reaction conditions" and like terms generally refer to temperature, pressure, reactant concentrations, catalyst concentration, cocatalyst concentration, monomer conversion, product and by-product (or solids) content of the reaction mixture (or mass) and/or other conditions that influence the properties of the resulting product. The reaction conditions for forming a prepolymer from a di-isocyanate and a polyol are well known in the art, and they typically include a temperature of 40° C. to 150° C., atmospheric pressure, a nitrogen atmosphere and the absence of water.

"Solvent" and like terms mean a substance that is capable of dissolving another substance (i.e., a solute) to form an essentially uniformly dispersed mixture (i.e., solution) at the molecular or ionic size level.

"Aprotic" and like terms describe a solvent, e.g., a glycol ether, that is not capable of donating a proton. Protic solvents are solvents that have a hydrogen atom bound to an oxygen (as in a hydroxyl group) or a nitrogen (as in an amine group). In general terms, any solvent that contains labile H+ is a protic solvent. Representative protic solvents include DOWANOL™ DPM (dipropylene glycol methyl ether), DOWANOL™ TPM (tripropylene glycol methyl ether), DOWANOL™ DPnP (dipropylene glycol n-propyl ether), DOWANOL™ DPnB (dipropylene glycol n-butyl ether), and DOWANOL™ TPnB (tripropylene glycol n-propyl ether). The molecules of such solvents readily donate protons (H+) to reagents. The glycol ethers used in the practice of this invention, e.g., PROGLYDE™ DMM (dipropylene glycol dimethyl ether), do not contain labile H+. The commercially available aprotic solvents that can be used in the practice of this invention may contain minor amounts of residual protic compounds from the manufacturing process by which the aprotic solvent is made. "Minor amounts" means typically less than or equal to (≤) 1 wt %, or ≤0.5 wt %, or ≤0.1 wt %, or ≤0.05 wt %, or ≤0.01 wt %, of protic compound in the aprotic solvent based on the combined weight of the aprotic solvent and protic compound.

Di-Isocyanate

The di-isocyanate may be an aromatic, an aliphatic, or a cycloaliphatic di-isocyanate, or a combination of two or more of these compounds. A nonlimiting example of a structural unit derived from a di-isocyanate (OCN—R—NCO) is represented by formula (I) below:

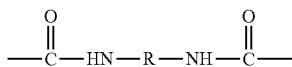

in which R is an alkylene, cyclo-alkylene, or arylene group. Representative examples of these di-isocyanates can be found in U.S. Pat. Nos. 4,012,445; 4,385,133; 4,522,975 and 5,167,899.

Nonlimiting examples of suitable di-isocyanates include 4,4'-di-isocyanato-diphenyl methane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate-3,3'-dimethyl-4,4'-biphenyl di-isocyanate, 4,4'-di-isocyanatodicyclohexyl-methane, 2,4-toluene di-isocyanate, and 4,4'-di-isocyanato-diphenylmethane.

Polyol

The polyols used in the practice of this invention, including both those with and without an acid group, have a molecular weight (number average) in the range from 200 to 10,000 g/mole. Nonlimiting examples of suitable polyols without an acid group include polyether diols (yielding a "polyether polyurethane"); polyester diols (yielding a "polyester polyurethane"); hydroxy-terminated polycarbonates (yielding a "polycarbonate polyurethane"); hydroxy-terminated polybutadienes; hydroxy-terminated polybutadiene-acrylonitrile copolymers; hydroxy-terminated copolymers of dialkyl siloxane and alkylene oxides, such as ethylene oxide, propylene oxide; natural oil diols, and any combination thereof. In one embodiment, a single polyol is used. In one embodiment, a combination of two or more polyols are used. In one embodiment, one or more of the foregoing polyols may be mixed with an amine-terminated polyether and/or an amino-terminated polybutadiene-acrylonitrile copolymer, depending upon the rate of reaction and the desired polymer structure. Triols and other polyols with more than two hydroxy groups can also be used, e.g., glycerol, trimethylolpropane, and the like. Further examples of polyols useful in the practice of this invention are found in U.S. Pat. No. 4,012,445.

In embodiments of the present invention, the total hydroxyl group equivalent weight of the polyol compound (including the acid group-containing polyol) is preferably 120 to 1,500. When the number of hydroxyl equivalents is within this range, the aqueous resin dispersion containing the obtained polyurethane resin can be easily produced, and a coating film excellent in terms of hardness can be easily obtained. From the viewpoints of the storage stability of the obtained aqueous polyurethane dispersion and the hardness, drying property and thickening property of the coating film obtained by coating, the hydroxyl group equivalent number is preferably 150 to 1000, or 200 to 700, or 300 to 600.

The hydroxyl equivalent weight of the polyols can be calculated by dividing the molecular weight of each polyol by the number of hydroxyl groups in the polyol (excluding phenolic hydroxyl group).

To introduce acid functionality into the prepolymer, at least some portion of the polyol that reacts with the di-isocyanate contains an acid group, e.g., a carboxyl group. The acid group-containing polyol contains two or more hydroxyl groups (excluding phenolic hydroxyl group) and one or more acidic groups in one molecule. Examples of the acidic group include a carboxyl group, a sulfonic acid group, a phosphoric acid group, a phenolic hydroxyl group, and the like. As the polyol containing an acid group, those having two hydroxyl groups and one carboxyl group in one molecule are preferable. The polyol containing an acid group may be used singly or in combination of two or more other polyols containing an acid group.

The polyol containing an acid group is not particularly limited, and examples include, but are not limited to, dimethylolalkanoic acids such as 2,2-dimethylolpropionic acid (DMPA) and 2,2-dimethylolbutanoic acid, N,N-bishydroxyethylglycine, N,N-bishydroxyethylalanine, 3,4-dihydroxybutanesulfonic acid, and 3,6-dihydroxy-2-toluenesulfonic acid. Among these, from the viewpoint of ease of availability, dimethylolalkanoic acid containing 2 methylol groups and having 4 to 12 carbon atoms is preferable. Among dimethylol alkanoic acids, 2,2-dimethylolpropionic acid is preferred.

Chain Extenders

Chain extenders are not necessary to the practice of this invention, but can be used if desired. If used, then these are polyfunctional, typically difunctional, and can be aliphatic straight or branched chain diamines or polyols having from 2 to 10 carbon atoms, inclusive, in the chain. Illustrative of such polyols are the diols ethylene glycol, 1,3-propanediol, 1,4-butanediol, 1,5-pentanediol, 1,6-hexanediol, neopentyl glycol, and the like; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyl-diethanolamine, and the like; and mixtures of any of the above. An example of a diamine is propylene diamine.

The prepolymer can contain, for example, from 2 to 25, preferably from 3 to 20 and more preferably from 4 to 18, weight percent (wt %) of the chain extender component.

Catalyst

The reaction of the di-isocyanate and polyol can be promoted through the use of a catalyst, in some embodiments. Examples of catalysts include, but are not limited to, a salt of a metal with an organic or inorganic acid, such as a tin-based catalyst (e.g., trimethyltin laurylate, dibutyltin dilaurate and the like), or a lead-based catalyst (e.g., lead octylate, etc.) and organic metal derivatives, amine-type catalysts (e.g., triethylamine, N-ethylmorpholine, triethylenediamine, etc.), and diazobicycloundecene-type catalysts. Tin-based catalysts are preferred in some embodiments.

Solvent System

The solvent system of this invention has a high affinity in terms of solubility for the polyol containing an acid group, e.g., DMPA. The solvent system of this invention is useful for the preparation of polyurethane prepolymers and PUDs.

The solvent systems of this invention consist essentially of, or consist of, a first component and an optional second component. The first component consists essentially of, or consists of, at least one glycol ether ketone. Glycol ether ketones that can be used in embodiments of the present invention have the following structure:

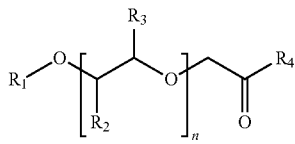

wherein $R_1$ is a linear or branched alkyl group having 1 to 8 carbon atoms, a benzyl group, or a phenyl group, wherein $R_2$ and $R_3$ can independently be hydrogen, $CH_3$, or $CH_2CH_3$, except that $R_2$ is hydrogen when $R_3$ is $CH_3$ or $CH_2CH_3$ and $R_3$ is hydrogen when $R_2$ is $CH_3$ or $CH_2CH_3$, wherein $R_4$ is $CH_3$ or $CH_2CH_3$, and wherein n is 0, 1, or 2. In some embodiments, the glycol ether ketone is 1-n-butoxy-2-propanone, 1-(2-methoxy-1-methylethoxy)-2-propanone, or 1-(2-n-propoxy-1-methylethoxy)-2-propanone. The solvent systems of this invention can comprise two or more glycol ether ketones. If the first component consists essentially of, or consists of, two or more glycol ether ketones, then the first component is a blend that may or may not be phase separated.

The optional second component consists essentially of, or consists of, an aprotic glycol ether, e.g., an esterified (preferably acetylated) or etherified compound based on an alkyl ether of ethylene glycol, propylene glycol or other alkyl, e.g., butyl, glycol. Diethers of diethylene glycol, dipropylene glycol and tripropylene glycol also can be used (PROGLYDE™ DMM is a diether of dipropylene glycol). In one embodiment the optional second component consists essentially of, or consists of, two or more aprotic glycol ethers. If the second component consists essentially of, or consists of, two or more aprotic glycol ethers, then the second component is a blend that may or may not be phase separated.

Representative aprotic glycol ethers include, but are not limited to, dipropylene glycol dimethyl ether and tripropylene glycol dimethyl ether, propylene glycol methyl ether acetate, propylene glycol diacetate, diethylene glycol n-butyl ether acetate, dipropylene glycol methyl ether acetate, and ethylene glycol butyl ether benzoate. The acetates are not particularly favored because of their limited water solubility and potential hydrolysis once the final PUD is made and as such, they are usually used, if at all, in combination with a water soluble aprotic solvent like PROGLYDE™ DMM or N,N-DMPA. Protic solvents such as ethylene glycol monobutyl ether, ethylene glycol monopropyl ether, diethylene glycol monoethyl ether, propylene glycol methyl ether, dipropylene glycol monomethyl ether and tripropylene glycol monomethyl ether, may be present in the solvent systems of this invention but only as a residue of the manufacturing process from which the aprotic component of in the solvent system is made, and then in only minor amounts, e.g., less than or equal to ($\leq$) 1 wt %, based on the combined weight of the aprotic and protic compounds in the solvent system. The protic solvents are disfavored because they, like water, react fast with the isocyanate.

Commercially available aprotic glycol ethers that can be used in the practice of this invention include, but are not limited to, DOWANOL™ PMA (propylene glycol methyl ether acetate), DOWANOL™ DPMA (dipropylene glycol methyl ether acetate), DOWANOL™ PGDA (propylene glycol diacetate), Butyl CELLOSOLVE™ acetate (ethylene glycol n-butyl ether acetate), Butyl CARBITOL™ acetate (diethylene glycol n-butyl ether acetate), ethylene glycol butyl ether benzoate, and PROGLYDE™ DMM (dipropylene glycol dimethyl ether), all available from The Dow Chemical Company. Another aprotic glycol ether that can be used in some embodiments is tripropylene glycol dimethyl ether.

The solvent can be a binary blend of two glycol ether ketones, or a binary blend of (1) one or more glycol ether ketones (e.g., 1-n-butoxy-2-propanone, 1-(2-methoxy-1-methylethoxy)-2-propanone, or 1-(2-n-propoxy-1-methylethoxy)-2-propanone), and (2) one or more aprotic glycol ethers, (e.g., PROGLYDE™ DMM dipropylene glycol dimethyl ether, tripropylene glycol dimethyl ether, etc.).

In one embodiment the solvent system consists of, or consists essentially of, in weight percent (wt %) based on the weight of the solvent system, from 10 to 100 wt %, or from 20 to 80 wt %, or from 30 to 70 wt %, or from 40 to 60 wt % of the first component, and from 0 to 90 wt %, or from 20 to 80 wt % or from 30 to 70 wt % or from 40 to 60 wt %, of the second component.

In one embodiment the solvent system consists of, or consists essentially of, in weight percent (wt %) based on the weight of the solvent system, from 30 to 100 wt %, or from 40 to 90 wt %, or from 50 to 80 wt %, of at least one of 1-n-butoxy-2-propanone, 1-(2-methoxy-1-methylethoxy)-2-propanone, or 1-(2-n-propoxy-1-methylethoxy)-2-propanone, and from 0 to 70 wt %, or from 10 to 60 wt %, or from 20 to 50 wt %, of an aprotic glycol ether. In one embodiment the aprotic glycol ether is dipropylene glycol dimethyl ether.

In those embodiments in which the first and/or second component consists of more than one substance, e.g., the first component consists essentially of two or more glycol ether ketones, and/or the second component consists essentially of two or more aprotic glycol ethers, the amount of each substance in a particular component can vary widely and to convenience. The amount of each individual substance in the component can vary from 0 to 100 wt %, or from 1 to 99 wt %, or from 10 to 90 wt %, or from 20 to 80 wt % or from 30 to 70 wt %, or from 40 to 60 wt %, or 50 wt %, based on the weight of the component.

Optional materials that are not essential to the operability of, but can be included in, the solvent systems of this invention include, but are not limited to, antioxidants, colorants, water scavengers, stabilizers, fillers, diluents (e.g., aromatic hydrocarbons), and the like. These materials do not have any material impact on the efficacy of the solvent system for providing a reaction medium for the preparation of a prepolymer. These optional materials are used in known amounts, e.g., 0.10 to 5, or 4, or 3, or 2, or 1, weight percent based on the weight of the solvent system, and they are used in known ways.

Preparation of the Solvent Systems

Solvent systems of this invention consisting essentially of, or consisting of, two or more compounds, e.g., a glycol ether ketone and an aprotic glycol ether, are made using known equipment and known techniques. The individual components of the solvent system are commercially available, liquid at ambient conditions (23° C. and atmospheric pressure), and can simply be mixed with one another using conventional mixing equipment and standard blending protocols. The components can be added to one another in any order including simultaneously.

Use of the Solvent Systems

The solvent systems of this invention are eco-solvents, i.e., they do not have, or have at a reduced level, the toxicology issues associated with NMP. These solvent systems are used in the same manner as mediums for the preparation of a prepolymer as NMP and other polar solvents. Thus, one use for solvent systems of the present invention comprising glycol ether ketones is in the preparation of polyurethane dispersions as described further herein.

Polyurethane Dispersion

The process for producing an aqueous (water-based) polyurethane dispersion (PUD) is a three-step process comprising: (1) preparing the prepolymer as described above, (2) neutralizing the acid functionality of the prepolymer, and (3) dispersing the prepolymer in water and optionally extending the molecular weight. Virtually any base can be used as the neutralizing agent. Examples include, without limitation, trimethylamine, triethylamine, tri-isopropylamine, tributylamine, triethanolamine, N-methyldiethanolamine, N-ethyldiethanolamine, N-phenyldiethanolamine, dimethylethanolamine, diethylethanolamine, N-methylmorpholine, organic amines such as pyridine, inorganic alkali salts such as sodium hydroxide and potassium hydroxide, and ammonia. For the neutralization of carboxyl groups, organic amines are preferred, and tertiary amines more preferred, especially triethylamine Such tertiary amines can preserve the residual isocyanate in the prepolymer for subsequent reaction with chain extenders in the dispersion step.

In the step of dispersing the polyurethane prepolymer in an aqueous medium can be performed using conventional equipment and techniques. For example, the prepolymer can be added to a blender of stirred water and mixed until a substantially homogeneous blend is obtained. Alternatively, water can be added to a blender of stirred prepolymer. The mixing is typically conducted at ambient conditions (23° C. and atmospheric pressure). Various additives, e.g., stabilizers, antioxidants, surfactants, etc., can be added to the dispersion in known amounts and using known methods. The amount of prepolymer in the dispersion can vary widely, but typically the prepolymer comprises 5 to 60, or 15 to 50, percent of the dispersion by mass.

In some embodiments, after dispersing the neutralized prepolymer in water, a chain extender can be added to increase the molecular weight of the polyurethane. The molecular weight can be increased with a chain extender using techniques known to persons having ordinary skill in the art. Examples of chain extenders that can be used are described above. As previously noted, the prepolymer can contain, for example, from 2 to 25, preferably from 3 to 20 and more preferably from 4 to 18, weight percent (wt %) of the chain extender component.

In some embodiments, the polyurethane dispersions made according to embodiments of the present invention comprise 1 to 15% by weight of the glycol ether ketones used as the solvent.

The following examples are nonlimiting illustrations of the invention.

EXAMPLES

Synthesis of Glycol Ether Ketones

Oxidation of a glycol ether bearing a secondary OH group by any of various methods known to those skilled in the art yields a glycol ether ketone. The glycol ether ketones used in some embodiments of the present invention are prepared by two different procedures using commercially available trichloroisocyanuric acid as the oxidizing agent. Examples describing the preparation of 1-pentoxy-2-propanone ("PnPent Ketone") and 1-(2-methoxy-1-methylethoxy)-2-propanone ("DPM Ketone") follow:

Preparation of 1-pentoxy-2-propanone (PnPent Ketone)

An Erlenmeyer flask is equipped with a magnetic stir bar and thermocouple wire. The flask is charged with 1-pentoxy-2-propanol (160 g, 968.34 mmol), dichloromethane (485 mL), and TEMPO catalyst (2, 2, 6, 6-tetramethylpiperidine-1-oxyl, 1.52 g, 9.7 mmol). The light orange solution is cooled to 5° C. with an ice bath. Trichloroisocyanaruric acid (237.43 g, 1021.64 mmol) is added in small portions via spatula to control the temperature. The resulting mixture is stirred for one hour, then the ice bath is removed and the mixture stirred at room temperature for an additional two hours. The mixture is filtered and the filtrate cooled to 5° C. with an ice bath. A saturated solution of aqueous sodium carbonate (200 mL) is added. The mixture is transferred to a separatory funnel and the liquid phases separated. The organic phase is transferred to an Erlenmeyer flask and 200 mL of a saturated solution of sodium carbonate and 20 mL of a saturated aqueous solution of sodium sulfite are added. The mixture is stirred at room temperature overnight. The mixture is transferred to a separatory funnel and the liquid phases separated. The organic phase is washed with two 600 mL portions of brine, dried over anhydrous magnesium sulfate, filtered, and concentrated in a rotary evaporator to yield 147.78 g of crude product. A one-necked round bottom flask containing the crude product is equipped with a magnetic stir bar, a one-foot Oldershaw column, and a distillation head capable of reflux splitting. The crude product is vacuum distilled to afford various fractions weighing a total of 101.13 g. Product with purity of 98-99% by gas chromatography is used to prepare the polyurethane dispersion (PUD) as described below.

Preparation of 1-(2-methoxy-1-methylethoxy)-2 propanone (DPM Ketone)

A procedure reported by Hiegel et al. in Synthetic Communications, 22:11, pp. 1589-1595 for the oxidation of 2-octanol is adapted for this synthesis. A 5-L three-necked flask equipped with a built in thermocouple well is secured to the fume hood lattice. An IKA Eurostar Power control Visc variable speed electrical motor is secured to the lattice above the flask. A glass stirring shaft with a Teflon® paddle is fitted with a glass bearing with a Teflon sheath and attached to the motor by inserting the shaft into a short piece of stiff rubber tubing, itself inserted into a short steel rod secured to the chuck of the motor. A water-cooled 12-inch Allihn condenser topped with a nitrogen bubbler is attached to the flask. A lab jack is placed beneath the flask and an ice-water bath is placed on the lab jack. The lab jack is raised so that the flask is half immersed in the ice bath. A thermocouple is placed in the thermocouple well to which a small amount of glycerine had been previously added. The thermocouple is connected to a digital temperature controller. The flask is swept with nitrogen for about 10 minutes and then 897.06 g of 1-(2-methoxy-1-methylethoxy)-2-propanol (DOWANOL™ DPM, 6.05 mol), 848.6 g (10.7 mol) of anhydrous pyridine and 1567 g of acetone are added in succession through the open neck while maintaining the nitrogen sweep. A glass stopper is placed on the neck and the nitrogen flow reduced to establish a nitrogen blanket. The reaction mixture is stirred at 250 rpm and cooled to 15° C. with the ice bath. Trichloroisocyanuric acid (738.75 g, 3.2 mol) is added in 50-80 g portions over a period of 6 hours by momentarily removing the stopper and placing a solids addition funnel in the neck to facilitate the addition. The reaction temperature is maintained in the 15-25° C. range with the aid of the ice bath throughout the reaction. Once the addition is complete, the reaction mixture is left stirring overnight at room temperature.

A small sample of the reaction mixture is withdrawn with a disposable pipette, filtered through a 0.45 micron syringe filter, and analyzed in a gas chromatograph equipped with a 30 m×0.32 mm×1.0 micron Agilent J&W DB-1701 capillary column and a thermal conductivity (TCD) detector. The ratio of DPM Ketone to DOWANOL™ DPM is determined as 96.5% to 3.5% based on GC area. The reaction mixture is filtered through #4 filter paper and the filter cake washed with acetone. Most of the acetone and some pyridine are removed in a rotary evaporator at 35° C. and 135 mmHg. The crude product weighed 1682.7 g and contained 26.7% acetone, 14.0% pyridine, 1.8% DOWANOL™ DPM, 50.5% DPM Ketone and minor components.

The crude product is then combined in a 5-L round-bottom boiling flask with product from other DPM Ketone batches prepared by the same procedure, and the combined product purified by fractional distillation in a 1-foot×1-inch ID silver-lined, vacuum-jacketed, glass column packed with 0.25-inch ceramic saddles equipped with a water-cooled temperature controlled magnetic reflux splitter, a water-cooled receiver trap and valves for nitrogen and vacuum operation. Acetone and pyridine are recovered at 350-400 mmHg and 38° C. distillate temperature. The pressure is then reduced stepwise while collecting various intermediate fractions. DPM Ketone boiling at 32° C. and 1.6 mmHg is isolated in 97.8% purity with only 0.8% residual glycol ether. This product is subsequently used in PUD preparation as described below.

Description of Equipment for Preparation of Polyurethane Dispersions (PUDs)

Polymerization Reactor

Polyurethane prepolymers are prepared in a 300-mL jacketed glass vessel (part #CG-1929-10) from Chemglass Life Sciences equipped with a 100 mm Schott 0-ring flange and a bottom Teflon® screw plug valve with a glass drain port set at a 45 degree angle and terminated with a 14/20 male joint. The inlet and outlet jacket connections are attached by means of tubing (rated for the temperature and material used in the process) to a thermostatically controlled Cole Palmer water bath filled with a 50% by volume aqueous propylene glycol solution. The reactor is equipped with a glass lid bearing three 24/40 female joints in line. A glass bearing with a Teflon® sheath is fitted with a glass stirring shaft and placed in the center joint. The stirring shaft is attached to an overhead, digital stirrer motor from IKA (model Eurostar 20). A water-cooled Allihn condenser equipped with an adapter teed off to a nitrogen bubbler is placed on the second glass joint. A nitrogen adapter connected to a low pressure Dwyer flow meter via Tygon® tubing is placed on the third glass joint. This nitrogen connection is used to purge the reactor prior to loading reactants and to establish the initial nitrogen blanket. The adapter is replaced with a glass funnel when adding reactants and with a glass stopper during the reaction. The reactor lid is also equipped with a 14/20 female joint with a stopper for sampling purposes, and a 14/20 screw joint equipped with a glass thermocouple well. A thermocouple connected to a digital meter is placed in the thermocouple well to measure the internal reactor temperature. A nine-inch piece of Tygon tubing cut at an angle is attached to the drain port and secured with a clamp.

Dispersion Reactor

Polyurethane dispersions are prepared in a 3000-mL three neck round bottom flask equipped with a built-in thermocouple well, a glass bearing with a Teflon sheath fitted with a glass stirring shaft, and a glass stopper. The stirring shaft is attached to an overhead Heidolph RZR-2000 digital stirring motor. The flask is clamped to the hood lattice and rested on a cork ring. The Tygon tubing connected to the polymerization reactor's drain port was inserted into remaining neck of the flask. A thermocouple is inserted into the thermocouple well to measure the increase in temperature while the prepolymer is added to the water in the flask.

Polymerization and Dispersion Procedures

The PUD preparation scheme is detailed in FIG. 1 and described below. The amounts of the various reactants are adjusted in order to obtain a 300 g batch of polyurethane prepolymer for subsequent dispersion in 400 mL of water. The procedures that follow reflect the target amounts of the reagents in a typical preparation. The equipment used in the procedures is described above.

Preparation of Polyurethane

A reactor is thoroughly flushed with nitrogen before starting the reaction. The jacket temperature is set to 80° C. and the water to the condenser is turned on. Terathane 1000 diol (60.17 g, 0.1203 OH eq) and Terathane 2000 diol (84.25 g, 0.0843 OH eq) are weighed in plastic beakers and added to the vessel by momentarily replacing the nitrogen adapter with a glass funnel. The stirring motor is turned on to 150 rpm and the time of the addition is noted. After 3 hours, the jacket temperature is turned down to 60° C. and the diols are left stirring overnight under a nitrogen sweep to remove residual moisture. The next day, the nitrogen adapter is replaced with a glass stopper and a nitrogen blanket established through the nitrogen adapter on top of the condenser. The 2, 2-bis-(hydroxymethyl) propionic acid (DMPA) is weighed into a weigh boat (16.85 g, 0.2512 OH eq, 0.1256 COOH eq). The desired solvent for the process is weighed into a beaker (31.3 g). The stirring is turned off, the stopper removed, the glass funnel put in place and both of the components are added to the reactor (solvent last to wash DMPA into reactor). The funnel is removed, the stopper is put back in place and the stirrer is turned back on. The isocyanate (4, 4'-methylene bis-(cyclohexyl isocyanate, 95.48 g, 0.7277 NCO eq) is weighed into a disposable, plastic beaker on a balance placed inside the hood. The stopper is momentarily removed, the stirring turned off, and the isocyanate added slowly to the reactor via the glass funnel. The stirrer is turned on and set to 200 rpm and the bath temperature increased to 80° C. The reaction is monitored for about 10-15 minutes for a potential exotherm. After that time, the bath temperature is increased to 95° C. When the internal pot temperature reaches 90° C., a timer is set for 4 hours. When the time has elapsed, the stirring is discontinued and ~1.00 g of reaction mixture withdrawn with a disposable glass pipette, weighed into a 250-ml Erlenmeyer flask, and tested for % NCO using ASTM D2572. A residual NCO content of 4% is anticipated at the end of the reaction based on the amounts of reactants used. While the reaction is cooling, the triethylamine (TEA) required to neutralize the carboxyl content is weighed (11.96 g, 0.1194 base eq) into a syringe on a balance placed inside the hood. When the pot temperature reaches 70° C., the stirring is turned off, the stopper is momentarily removed to add the TEA, the stirring set to 250 rpm, and a timer set for 15 minutes. While the time elapsed, the dispersion flask is readied.

After the time has elapsed, the reactor's drain valve is opened and the polyurethane allowed to drain into the 3000 mL dispersion flask containing 400 mL of deionized water stirring at 400 rpm. This transfer took about 20 to 30 minutes depending on the viscosity of the polymer. When all of the polymer has been transferred, the stopper in the dispersion flask is replaced with an addition funnel equipped with a pressure equalizing arm and loaded with 19.31 g of an aqueous propylene diamine (PDA) solution containing 8.31 g PDA (0.2242 $NH_2$ eq) that had been previously prepared. The temperature in the dispersion flask is monitored along with the time taken for the addition. Once all of the PDA solution has been added, a timer is set for 20 minutes while the PUD continued to stir at 400 rpm. The stirrer is turned off and the PUD is allowed to sit in the flask overnight. The next day, the PUD is filtered (using a paint filter) into a labeled jar. The PUD is then characterized by its pH, viscosity, solids content, and performance in the minimum film formation temperature (MH-T) test. Samples of the PUD are drawn down on phosphated steel panels and the resulting films tested for their thickness, cross-hatch adhesion, König hardness, direct and indirect impact resistance, and gloss. The analytical procedures used to measure these properties are described in the Analytical Procedures section below.

Comparison of Polyurethane Dispersion (PUD) Properties

PUDs are prepared as described above with 1-n-butoxy-2-propanone (PnB Ketone), 1-butoxy-2-butanone (BnB Ketone), 1-(2-methoxy-1-methylethoxy)-2-propanone (DPM Ketone), 1-(2-n-propoxy-1-methylethoxy)-2-propanone (DPnP Ketone), and 1-n-pentoxy-2-propanone (Pn-Pent Ketone). PUDs are also prepared as described above with NMP and PROGLYDE™ DMM for comparison purposes (not inventive examples). Properties of the PUDs are measured and summarized in Table 1. Although differing somewhat in viscosity, all PUDs prepared with the glycol ether ketones displayed the same coalescing efficiency as those prepared with NMP and PROGLYDE™ DMM, as shown by the results of the MFFT evaluation. The film properties obtained from the various PUDs are summarized in Table 2. The PUDs prepared with glycol ether ketones yielded films with excellent adhesion and impact resistance, hardness values greater than the desired 50 seconds, and gloss similar to those obtained with the controls (NMP and PROGLYDE™ DMM).

TABLE 1

| Examples | Solvent | Viscosity (cP) [1] | pH | MFFT (° F.) | Wt % Solids [2] |
|---|---|---|---|---|---|
| Comparative A | PROGLYDE ™ DMM | 131 | 8.1 | <31 | 36.5 |
| Comparative B | NMP | 78 | 8.3 | <31 | 35.3 |
| Inventive 1 | DPM Ketone | 132 | 8.0 | <30 | 36.7 |
| Inventive 2 | DPM Ketone | 186 | 8.3 | <31 | 36.1 |
| Inventive 3 | PnPent Ketone | 116 | 9.4 | <30 | 30.7 |
| Inventive 4 | BnB Ketone | 269 | 9.3 | <30 | 34.8 |
| Inventive 5 | PnB Ketone | 158 [3] | 8.3 | <30 [3] | 30.3 [3] |
| Inventive 6 | DPnP Ketone | 221 | 9.0 | <30 | 35.8 |

[1] Coefficient of Variation of (+/−) 1% determined from measurements of viscosity standards
[2] Average of 3 samples with Coefficient of Variation of (+/−) 0.1-0.6%
[3] Evaluated after diluting PUD with water to reduce viscosity

TABLE 2

| Examples | Panel # | Thickness (ave. mils)[1] | Average Gloss | | | C.H. Adhesion % removed | Average König Hardness (sec)[5] | Impact (lb · in) | |
|---|---|---|---|---|---|---|---|---|---|
| | | | 20° [2] | 60° [3] | 85° [4] | | | Direct | Indirect |
| Comparative A | 1 | 2.05 | 71.6 | 102 | 96.9 | 0 | 78 | >160 | >160 |
| | 2 | 1.57 | 70.4 | 102 | 95.8 | 0 | 77 | 130 | >160 |
| Comparative B | 1 | 1.55 | 66.0 | 102 | 95.8 | 0 | 72 | >160 | >160 |
| | 2 | 1.65 | 66.9 | 102 | 95.6 | 0 | 72 | >160 | >160 |
| Inventive 1 | 1 | 1.87 | 68.0 | 102 | 96.0 | 0 | 74 | >160 | >160 |
| | 2 | 1.87 | 67.2 | 102 | 96.0 | 0 | 76 | 140 | >160 |
| Inventive 2 | 1 | 1.90 | 65.6 | 99.3 | 95.0 | 0 | 64 | >160 | >160 |
| | 2 | 2.08 | 69.0 | 100 | 94.9 | 0 | 65 | >160 | >160 |
| Inventive 3 | 1 | 1.45 | 54.6 | 100 | 91.6 | 0 | 64 | >160 | >160 |
| | 2 | 1.54 | 57.6 | 100 | 92.8 | 0 | 67 | >160 | >160 |
| Inventive 4 | 1 | 1.97 | 68.3 | 101 | 96.1 | 0 | 71 | >160 | >160 |
| | 2 | 1.85 | 63.2 | 100 | 95.1 | 0 | 68 | >160 | >160 |
| Inventive 5 | 1 | 1.78 | 63.9 | 100 | 94.7 | 0 | 66 | >160 | >160 |
| | 2 | 1.82 | 62.5 | 101 | 96.0 | 0 | 62 | >160 | >160 |

TABLE 2-continued

| Examples | Panel # | Thickness (ave. mils)[1] | Average Gloss | | | C.H. Adhesion % removed | Average König Hardness (sec)[5] | Impact (lb · in) | |
|---|---|---|---|---|---|---|---|---|---|
| | | | 20°[2] | 60°[3] | 85°[4] | | | Direct | Indirect |
| Inventive 6 | 1 | 2.12 | 70.3 | 102 | 96.1 | 0 | 57 | >160 | >160 |
| | 2 | 2.13 | 66.0 | 101 | 95.2 | 0 | 57 | >160 | >160 |

[1] Avg of 3 measurements per panel
[2] Coefficient of Variation of +/−0.2-9%
[3] Coefficient of Variation of ±0.1-1.1%
[4] Coefficient of Variation of ±0.1-1.6%
[5] Coefficient of Variation of ±1-6%

Analytical Procedures

Percent Water Determination

The water content of all of the solvents used is measured as per ASTM E203 using a Mettler V30 Karl Fisher Water Titrator attached to a Mettler Toledo GA 42 printer and a Mettler Toledo AE160 analytical balance. A 1-cc syringe equipped with a 21 G×½" needle is loaded with solvent, placed on the analytical balance and tared. The sample (0.8775-2.5131 g) is added to the titration cup and the titration started. A water standard from Aquastar® containing 1.00% water by weight is used to verify that the equipment is operating properly. High water contents would negatively impact the polyurethane formation by reacting with the isocyanate. If the water content is high (over 0.06 wt %), molecular sieves are added to the solvent and the solvent allowed to sit for a few days before use.

Percent Solids (Wt % Solids)

The weight percent solids is determined as per ASTM D2369. Samples are prepared in triplicate by weighing 0.5 g of material (exact weight recorded to four decimal places) into tared and labeled disposable aluminum pans. The pans are placed on a tray acting as a secondary container, covered with a section of steel mesh, and placed in a Blue M oven at 110° C. for 1 hour. (The mesh is used to prevent the pans from being blown around inside the oven). Once the time has elapsed, the pans are removed from the oven, allowed to cool and reweighed. The solids content of each sample is calculated using the equation below and the triplicate results are averaged.

$$\text{Wt \% Solids} = \frac{(\text{wt. of boat after 1 hour (g)} - \text{wt. empty boat (g)})}{\text{Initial sample wt. (g)}} \times 100$$

Percent Isocyanate (% NCO)

The percent NCO of the polyurethane prepolymer is determined as per ASTM D2572. In this analysis, any unreacted isocyanate in the polyurethane is reacted with excess dibutyl amine in toluene, and the % NCO calculated by back titrating the unreacted amine with 0.1 N HCl. A blank is run by taking an oven-dried 250-mL Erlenmeyer flask containing a 1-inch Teflon® stir bar, cooling it under a nitrogen flow, and adding 25 mL of anhydrous toluene. A stopper is placed on the flask momentarily before adding 25 mL of 0.1 N dibutylamine in toluene via a TD (to deliver) pipette. The flask is stoppered and clamped in place on a stir plate, and stirred at a low rate for 15 minutes. Next, 100 mL of isopropyl alcohol is added to the flask using a graduated cylinder, followed by 6 drops of bromophenol blue indicator solution (prepared as described below). The flask is stoppered, the solution stirred for 1 minute, then titrated to a light yellow end point with 0.1N HCl. When titrating a polymer sample, the oven-dried Erlenmeyer flask containing the 1-inch Teflon® stir bar is removed from the oven, cooled under nitrogen, stoppered and placed on a balance. A sample withdrawn from the reactor with a disposable glass pipette is added to the flask by momentarily removing the stopper while taking care not to deposit sample on the walls of the flask. The weight of the sample is recorded and the flask is placed on the stir plate, the stopper is momentarily lifted, and 25 mL of dry toluene was added. If the sample did not dissolve with gentle stirring, a heat gun is used to warm the flask and help dissolve the sample. A 25 mL aliquot of 0.1 N dibutylamine solution (prepared as described below) is added to the sample, and the same titration procedure used for the blank is followed. The % NCO is calculated using the equation:

$$\% \; NCO = \{[(B-V) \times N \times 0.0420]/W\} \times 100$$

where B=mL of HCl solution for blank titration, V=mL of HCl solution for sample titration, N=normality of HCl solution (0.10 N), 0.0420=milliequivalent weight of the NCO group, and W=sample weight (g).

The 0.1 N solution of bromophenol blue indicator is prepared by mixing 0.1013 g of water-insoluble bromophenol blue (acid form) with 1.5 mL of 0.1 N NaOH solution in a volumetric flask, and diluting to 100 mL with deionized water.

The 0.1 N solution of dibutylamine is prepared by adding 6.46 g of dibutylamine to a 500 mL volumetric flask and diluting to the mark with anhydrous toluene. The molecular weight of dibutyl amine is 129.24 g/mol.

pH

The pH of the PUD is measured using a calibrated Metro Toledo T70 Titrator attached to a computer and printer. The probe of the pH meter is rinsed with deionized water, wiped with a Chem-Wipe and inserted into the sample. The pH shortcut button is pressed and the probe is then held stationary in the sample and allowed to equilibrate for ~30 seconds before recording the pH value.

Viscosity

PUD viscosity is measured at 25° C. using a Brookfield Programmable DV-II+ Viscometer attached to a Brinkmann MGW Lauda RM6 circulating bath filled with a 50:50 water-propylene glycol solution. A 0.5 mL sample of the PUD is placed in the center of the sample cup using a disposable syringe. Measurements are conducted with a CP-40 spindle.

Minimum Film Formation Temperature Testing (MFFT (° F.)

MFFT tests are conducted according to ASTM D2354. The MFFT plate is set to the appropriate temperature (the typical range is 31-53° F.) and allowed to stabilize. Once the temperature is stable, six 1-inch wide×24-inch long pieces of Scotch tape from 3M are placed on the MFFT plate. Care is taken to ensure that the plate is free of condensation and that the tape was securely in place. The circular 5-mil draw down bar is centered over each piece of tape on the right hand side of the plate and the PUD sample is dispensed into the draw down bar using a disposable pipette. Even pressure is used to draw down the sample on the tape. A Plexiglas board with calibration lines corresponding to a specific heated position on the plate is set in place over the samples being tested, and an airline is attached to the Plexiglas board. The air pressure is set at 20 psig and a timer set for 4 hours. A single sample is run for each PUD. The MFFT is indicated by a defect (i.e. cracking) at a given position (temperature) on the film.

The films prepared from the PUDs are tested according to below methods.

Draw Down and Curing Process

A 10-mil wet film of the PUD is drawn down onto a 4"×12"×0.032" iron-phosphorous unpolished panel. The coated panels are placed on a tray which is then placed in a vented 60° C. oven for 30 minutes. The tray of panels is removed from the oven and the panels placed on a rack in a constant temperature (72° F.) and constant humidity (42%) lab. The panels are left on the rack for 7 days before analysis.

Thickness

The thickness in mils of the cured PUD films is measured using a PosiTector 6000 thickness meter. The probe is first calibrated using an untreated panel. The probe is placed flat on the coated panel and the measurement recorded. A total of 3 measurements are made on each panel tested, placing the probe in different locations of the coated surface. The average thickness is calculated.

Gloss

Gloss is measured according to ASTM D523. Measurements are made using a micro Tri-Gloss)(20°/60°/85° gloss meter. For each reading, the instrument is moved to a different position on the substrate. The measurement is made 3 times and the average reported. Cross Hatch Adhesion (C. H. Adhesion)

Cross hatch adhesion testing is performed according to ASTM Method D3359, Method B. The adhesion test is used to determine if the clear coat had properly adhered to the surface of the panel. The testing is performed by placing the panel on a firm counter, scoring the coated panel using the cutting tool in one direction, then scoring over the already scored area in a perpendicular direction (so the pattern looked like a checkerboard). Any flakes or dust are lightly brushed away. The ASTM tape is placed over the checkerboard area and a tab left on the one end. The tape is pressed firmly over the area, and then in a smooth, steady motion, the tape is pulled off quickly at a 90° angle with one hand while holding the panel against the flat surface with the other. The cross-cut area is rated for adhesion by comparing it to the examples in FIG. 1 of the ASTM method.

König Pendulum Hardness (Average König)

The hardness test is performed according to ASTM D4366 using a BYK Gardner Pendulum Hardness Tester. The coated panel is placed on the lifting table and, using the handle, lifted into place. The pendulum is drawn back behind the pin using the displacement arm and the wire release button is pushed and held in. The start button on the front of the unit is pushed and then the wire release button is released. The instrument starts counting oscillations and gives an audible indication when the pendulum stopped. The number of oscillations is recorded in seconds, the panel is moved to a new location, and the testing process repeated. Each sample is tested three times, and the average value is reported.

Impact Resistance Direct/Indirect (Impact—Direct and Indirect)

Direct impact testing is performed according to ASTM Method D2794 using the heavy duty impact tester PF-1120 from BYK Gardner loaded with a 4-pound impact punch. The punch is lifted with one hand and the coated panel (coated side up) is placed between the punch and the retaining cup. The punch is gently lowered onto the testing panel. The weight is lifted to its maximum height with one hand while holding the panel steady with the opposite hand. The weight is released. After impact, the punch is lifted and the panel is inspected for damage, such as star cracking or delamination. If damage occurred, the process is repeated in a different spot, lowering the height of the weight until no damage is observed. Results are recorded in lb. inches. The same process is followed for indirect impact testing, except that the panel is placed coated side down toward the retaining cup.

What is claimed is:

1. A process for making a prepolymer comprising an acid group, the process comprising the step of contacting
   (i) a di-isocyanate,
   (ii) a polyol containing an acid group, and
   (iii) a polyol without an acid group,
the contacting conducted under reaction conditions and in a solvent consisting essentially of:
   (A) a first component consisting of at least one glycol ether ketone selected from one or more of the glycol ether ketone is 1-n-butoxy-2-propanone, 1-(2-methoxy-1-methylethoxy)-2-propanone, or 1-(2-n-propoxy-1-methylethoxy)-2-propanone, and
   (B) optionally, a second component consisting of at least one aprotic glycol ether.

2. The process of claim 1 in which the acid group is a carboxyl group.

3. The process of claim 1 which the polyol containing an acid group is 2,2-dimethylolpropionic acid.

4. The process of claim 1 in which the optional second component is present and is at least one of dipropylene glycol dimethyl ether and tripropylene glycol dimethyl ether.

5. The process of claim 1, wherein a metal salt catalyst is used in the contacting step.

6. The process of claim 5, in which the metal salt catalyst is an organic tin salt catalyst.

7. A blend comprising (1) a glycol ether ketone selected from one or more of the glycol ether ketone is 1-n-butoxy-2-propanone, 1-(2-methoxy-1-methylethoxy)-2-propanone, or 1-(2-n-propoxy-1-methylethoxy)-2-propanone, and (2) an aprotic glycol ether.

8. The blend of claim 7 in which the aprotic glycol ether is at least one of dipropylene glycol dimethyl ether and tripropylene glycol dimethyl ether.

9. A polyurethane dispersion (PUD) comprising (i) a prepolymer comprising an neutralized acid group, (ii) a glycol ether ketone selected from one or more of the glycol ether ketone is 1-n-butoxy-2-propanone, 1-(2-methoxy-1-methylethoxy)-2-propanone, or 1-(2-n-propoxy-1-methylethoxy)-2-propanone, and (iii) water.

10. The PUD of claim 9 further comprising an aprotic glycol ether.

\* \* \* \* \*